United States Patent [19]

Bacardit

[11] 4,320,780
[45] Mar. 23, 1982

[54] HYDRAULIC CONTROL VALVE

[75] Inventor: Juan S. Bacardit, Barcelona, Spain

[73] Assignee: Bendiberica S.A., Barcelona, Spain

[21] Appl. No.: 200,680

[22] Filed: Oct. 27, 1980

[30] Foreign Application Priority Data

Nov. 1, 1979 [ES] Spain .................................. 485.604

[51] Int. Cl.³ ............................................. F16K 11/02
[52] U.S. Cl. .................................. 137/625.21; 91/434
[58] Field of Search ..................... 137/625.21, 625.22, 137/625.23, 625.24; 91/370, 371, 372, 373, 375 R, 375 A, 434

[56] References Cited

U.S. PATENT DOCUMENTS

| | | | |
|---|---|---|---|
| 3,940,949 | 3/1976 | Ohki ........................... | 137/625.21 X |
| 4,217,932 | 8/1980 | Bacardit ........................ | 137/625.21 |
| 4,232,708 | 11/1980 | Miller ............................ | 137/625.21 |

FOREIGN PATENT DOCUMENTS 1195710 2/1971 United Kingdom .

*Primary Examiner*—Alan Cohan
*Attorney, Agent, or Firm*—Paul David Schoenle; Ken C. Decker

[57] ABSTRACT

Control valve in which the reaction torque is created firstly by hydraulic reaction means and secondly by resilient means to provide for a second gradient of reaction torque; the invention consists in a control valve having a star-shaped rotor rotatably mounted in a disc chamber of a stator to define notably with a constituting member of that chamber several working chambers, the arms of said star-shaped rotor being of unequal lengths to provide for a first gradient of reaction torque, as known per se, and the improvement consisting in that the member is rotatable with respect to a surrounding intermediate member of said stator and that resilient means are located between members to provide for a second gradient of reaction torque.

3 Claims, 6 Drawing Figures

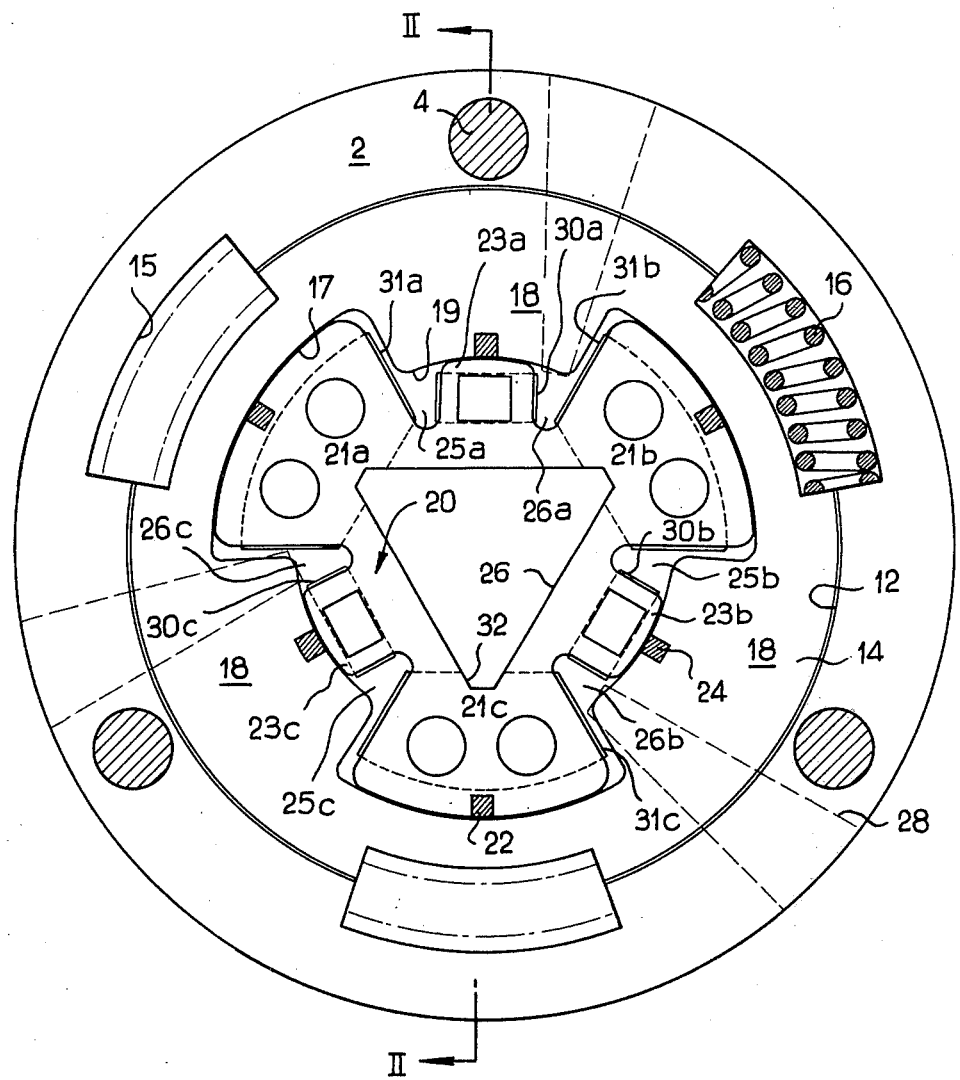
FIG_1

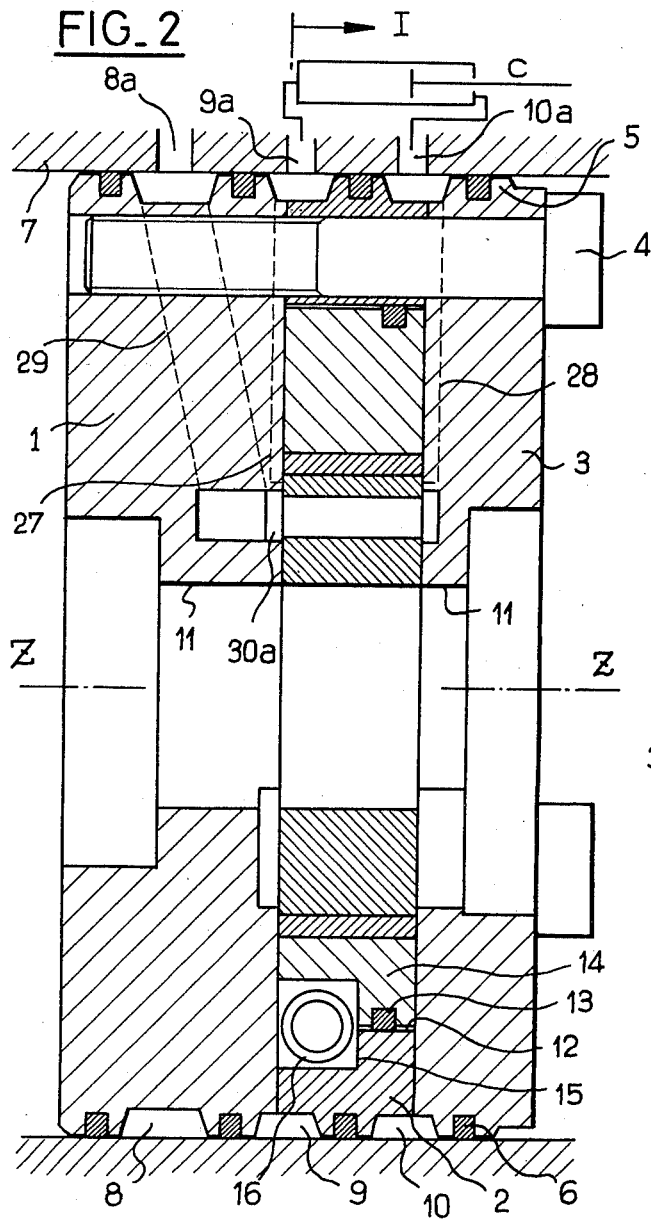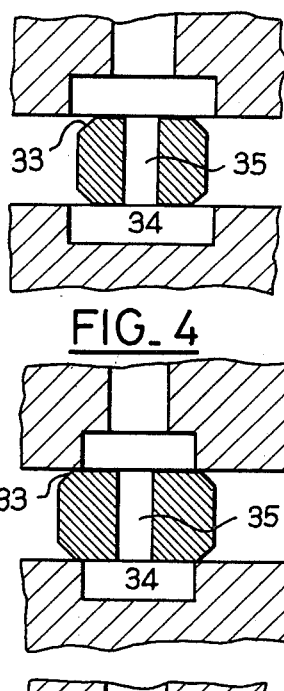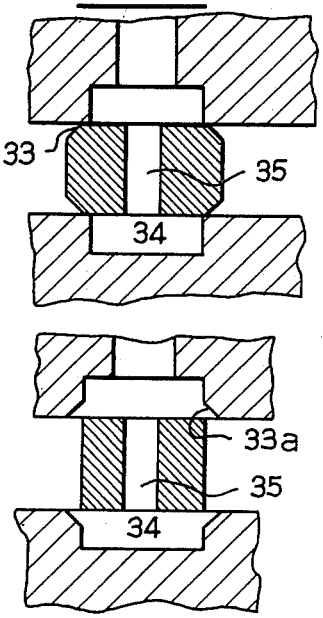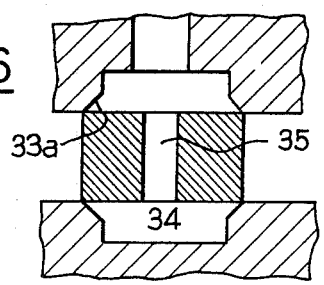

HYDRAULIC CONTROL VALVE

This invention relates to a hydraulic control valve and particularly to improvements in such a single or double acting hydraulic device control valve.

Known valves are designed for providing an output pressure proportional to the displacement of a moving valve member or to a drive torque applied thereto, in which the moving member is formed by a rotor rotatable around an axis by a drive member and having at least one radially extending short arm and one radially extending long arm, the ends of slidingly engage respective cylindrical surfaces having a corresponding radius, of a disc-shaped chamber, the surfaces of which engage with the rotor surfaces defining at least one working chamber, connected with the hydraulic device to be controlled, a hydraulic fluid inlet port and outlet port being disposed in the chamber base surfaces, the first one mating with the short arm and the second one with the long arm so that the movement of the rotor in an inlet port opening direction generates an increase of the operating pressure in the working chamber and a corresponding reaction on the surface of the long arm adjacent the working chamber.

The said reaction generated against the long rotor arm and transmitted to the drive member provides information on the degree of drive in each case. Generally there is established as a characteristic of the valve the drive pressure obtained as a function of a particular displacement of the rotor or of the torque applied thereto to produce such displacement, which characteristic is more or less linear or having a predominant gradient within the stroke range or torque.

But in certain applications, for example in driving vehicle power assisted steering, it may be necessary to have a portion of the characteristic with a different gradient, for example, a steeper gradient as from a certain stroke or drive torque, to reduce the normal small oscillations around the rest position or to provide an increased response as from a certain torque or drive stroke. This effect has already been attained in known embodiments by valve devices arranged to modify the hydraulic circuit operating conditions in the desired way and which, in all cases, represent an obvious complication of the device.

It is an object of the invention to provide a new solution for this problem. Accordingly, the invention consists in a hydraulic control valve, of the type providing an output pressure which is a function of the displacement of a moving valve member or of the drive torque applied thereto, which moving member is formed by a rotor rotatable around an axis and having at least one radially extending short arm and one radially extending long arm, the ends of which slidingly engage respective cylindrical surfaces having a corresponding radius, of a disc-shaped chamber the surfaces of which engage with the rotor surfaces defining at least one working chamber connected with the hydraulic device to be controlled, a hydraulic fluid inlet port and outlet port being disposed on the chamber base surfaces, the first one mating with the short arm and the second one with the long arm so that in operation there is produced a reaction on the surface of the long arm adjacent the chamber, characterized essentially in that the disc-shaped chamber is formed in a member rotatably mounted around the axis of the rotor in a cavity formed in the valve body, said member being held in the rest position of the valve by resilient means and being provided with stop means engaging mating parts of the rotor when the latter is moved from the rest position thereof, the arrangement being such that the rotor stroke to the stop means corresponds to a first gradient of the valve characteristic and the loading of the resilient means, which are compressed from this stop position onwards, corresponds to the gradient of a second part of the characteristic.

Preferably the resilient means are helical springs housed in cavities formed in the perimetral interface between the disc-shaped chamber member and the valve body, such that each spring end bears simultaneously against one portion of the corresponding end of the cavity forming part of the member and a mating end portion of the body, said springs holding the disc-shaped chamber member in a centre position, from which it may be resiliently displaced in either direction.

On the other hand, the disc-shaped chamber and rotor stroke stop means are formed by the opposed lateral sides of each long arm of the rotor and of the disc-shaped chamber protuberance carrying the lesser cylindrical surface adjacent said arm.

The accompanying drawings illustrate schemtically a preferred embodiment of the invention and are to be deemed as exemplary and not limitative of the scope of the invention. In the drawings:

FIG. 1 is a cross sectional view of a valve according to the invention, in the double acting form, taken along the line I—I of FIG. 2;

FIG. 2 is an axial sectional view taken along the line II—II of FIG. 1; and

FIGS. 3 to 6 inclusive are cross sectional views taken along the line III—III of FIG. 1, showing different embodiments of short rotor arms.

The three annular members 1, 2 and 3, fixedly connected together by the bolts 4, form a cylindrical valve body having annular ribs 5 with seals 6 which, when engaging with the inner cylindrical surface of a mounting indicated generally with 7, define three channels 8, 9 and 10 which in the assembled position mate with the respective conduits 8a, 9a and 10a, for connection of the valve to the external circuits, as will be presently described.

The two outermost members 1 and 3 are provided with a centre orifice 11 for the passage of the drive shaft (not shown) of the valve. The central member 2 is provided with a cylindrical orifice 12 coaxial with the axis Z—Z of the valve and having a larger diameter than the orifices of the outermost members, so that a cylindrical cavity is formed between said orifice 12 and the opposed faces of the outermost members wherein a disc-shaped chamber member 14 is rotatably and sealedly housed by way of seal 13. In the side thereof facing the outermost member 1, the intermediate member 2 and the chamber member 14 are provided in their inner and outer edges, respectively, with a plurality of stepped notches, radially opposed in pairs so as to form respective cavities 15 extending circumferentially on both sides of the cylindrical interface between both members, there being compressed within each of said cavities under a preset load a helical spring 16, the ends of which, owing to the fact that both notches of each pair have a like angular extension, bear simultaneously against both members and hold them relatively stationary in a rest position as illustrated in FIG. 1. Nevertheless, as may be deduced from this Figure, the chamber member 14 may be moved in both directions from the said rest position against the bias of the springs.

As will be appreciated from FIG. 1, member 14 is provided with a central opening forming the so-called disc-shaped chamber, axially limited by the opposing faces of the outermost members 1 and 3 and perimetrically by three segments 17 of a cylindrical surface, coaxial with the axis Z—Z. Said segments are of equal radius and are circumferentially equidistantly spaced between three internal protuberances 18 of member 14 which form further segments of a cylindrical surface 19, coaxial with the former and having a shorter common radius.

A valve rotor, indicated with the general reference 20, is mounted in the above described disc-shaped chamber and comprises three long arms 21a, 21b and 21c, loosely mounted in the circumferential direction between the protuberances 18 of member 14 carrying the three minor cylindrical surfaces 19 the ends of which snugly engage the major cylindrical surfaces 20 with longitudinal seals 22. The rotor also comprises further three short arms 23a, 23b and 23c which engage the minor cylindrical surfaces 19 by means of the seals 24. The ends of the rotor engage the opposed faces of the outermost members 1 and 3 so that at both sides of each short arm 23a, 23b and 23c there is formed a pair of working chambers 25a, 26a, 25b, 26b, 25c and 26c in fluid communication as will be presently described. The centre portion of the rotor is provided with a substantially triangular window 26 in which there may engage a mating portion of a valve drive shaft (not shown), which will extend outwardly from one of the valve ends for connection thereof to a control member appropriate to each application. When the valve is applied to a vehicle power assisted steering control, said member could be a steering column and in this case the valve body 1, 2, 3 would be rotatably connected to a steering gear input member, for example, the steering box drive spindle.

The three chambers 25 are connected by channels 27 formed in the inner surface of the outermost member 1 with the annular throat 9 in the outer surface of the valve body and the three chambers 26 are connected by similar channels 28 in the outermost member 3 with the throat 10. The conduits 9a and 10a which open into these throats are connected to respective chambers of a double acting drive cylinder C (in the example, a steering box with piston nut).

Oil is fed via the conduit 8a, throat 8 and channels 29 formed in the outermost chamber 1 and which open into the inner face thereof through ports 30a, 30b and 30c which are covered by the short arms 23 or mate essentially therewith in the rest position of the valve. The oil is discharged through similar ports 31a, 31b and 31c, associated in the same way with the long arms and communicating over 32 with the central orifices 11, from which it may be returned to the oil reservoir by conventional means.

FIG. 3 is a schematic representation in cross section of a detail of one of the short arms 23. It is seen to be of the known "open centre" construction, namely in which the oil flow is maintained even when the valve is in the rest position, but the "closed centre" arrangement of FIG. 4 could also be used. Bevels 33 have been provided in both embodiments to modulate the valve characteristic in the edges of the arms, but such bevels (33a) could also be contemplated in the ports 30, as seen in FIGS. 5 and 6, which repeat, respectively, the open centre and closed centre versions. Any combination of bevels in the two positions described would also be possible.

The cavities 34 disposed symmetrically relative to the ports and channels 35 communicating them therewith, serve to balance the pressures on both sides of the rotor arms and are also known features in this type of valve.

The same comments are valid for the long arms.

The general operation of the valve described is conventional. With the open centre version shown in the drawings and considering the short arm 23a and the long arms 21a and 21b, the oil arriving at port 30a is equally distributed between the chambers 25a and 26a and exits through the ports 31a and 31b, maintaining equal pressures in the conduits 9a and 10a, so that the power assisted steering gear (cylinder C) is held inactive. When the rotor 20 is displaced towards one of the sides, for example clockwise relative to the disc-shaped cavity member 14, the chamber 26a is fully connected to the discharge flow through port 31b and the enclosure 25a is fully connected to the oil inflow through the left hand end of port 30a, in other words, the pressure in the right hand enclosure is cancelled out and the pressure in the left hand enclosure increases; the piston in cylinder C is moved to the right. Until the arms 21 engage the protuberances 18 in front of them in the direction of movement, the drive torque is determined by the reaction that the pressure in the chambers 25 exercises on the adjacent long arms, giving rise to the shallow gradient portion of the characteristic.

Nevertheless, consequent on the features of the invention, when the long arms 21 reach the protuberances 18, the operation must continue with the disc-shaped chamber member 14 being driven clockwise and compression of the springs 16, so that from this moment onwards, the characteristic gradient is constituted by the spring loading.

The same operation takes place with respect to the other short arms 23 and the operation is symmetrical to the above described for displacement of the rotor in the opposite direction.

Obviously, the distribution of the two gradients and the respective degrees depend exclusively on the effects it is wanted to attain and on the design.

As will be appreciated, the double gradient effect is attained in accordance with the invention by extremely simple means which do not essentially modify the manufacturing processes of the different parts of the valve. As in previous cases, the conventional techniques, such as sintering, electrospark erosion and electochemical machining, may be used.

In other respects, the accessory details and other non-essential constructive features used in the implementation of the invention will be independent of the object thereof, since all are comprised within the scope of the following claims.

I claim:

1. Hydraulic control valve, of the type providing an output pressure which is a function of the displacement of a moving valve member or of the drive torque applied thereto, which moving member is formed by a rotor (20) rotatable around an axis and having at least one radially extending short arm (23a) and one radially extending long arm (21a), the ends of which slidingly engage respective cylindrical surfaces (19, 17) having a corresponding radius, of a disc-shaped chamber, the surfaces of which engage with the rotor surfaces defining at least one working chamber (25a) connected with the hydraulic device (C) to be controlled, a hydraulic fluid inlet port (30a) and outlet port (31a) being disposed on the chamber base surfaces, the first one mating with the short arm and the second one with the long arm so that in operation there is produced a reaction on the surface of the long arm adjacent the chamber, characterized essentially in that the disc-shaped chamber is formed in a member (14) rotatably mounted around the axis of the rotor in a cavity formed in the valve body, said member being held in the rest position of the valve by resilient means (16) and being provided with stop means (18) engaging mating parts (21) of the rotor when the latter is moved from the rest position thereof, the arrangement being such that the rotor stroke to the stop means corresponds to a first gradient of the valve characteristic and the loading of the resilient means, which are compressed from this stop position onwards, corresponds to the gradient of a second part of the characteristic.

2. Hydraulic control valve, according to claim 1, characterized in that the resilient means (16) are helical springs housed in cavities (15) formed in the perimetral interface between the disc-shaped chamber member (14) and the valve body (2), such that each spring end bears simultaneously against one portion of the corresponding end of the cavity forming part of the member and a mating end portion of the body, said springs holding the disc-shaped chamber member in a centre position of rest, from which it may be displaced in either direction.

3. Hydraulic control valve, according to claim 1, characterized essentially in that the disc-shaped chamber member and rotor stroke stops are formed by the opposed ends of each long rotor arm (21) and of the protuberance (18) of the disc-shaped chamber carrying the minor cylindrical surface adjacent said arm.

* * * * *